United States Patent [19]

Presley

[11] 4,141,432
[45] Feb. 27, 1979

[54] RACK AND PINION STEERING DEVICE

[75] Inventor: Rex W. Presley, Livonia, Mich.

[73] Assignee: The Bendix Corporation, Southfield, Mich.

[21] Appl. No.: 839,677

[22] Filed: Oct. 5, 1977

[51] Int. Cl.² .............................................. B62D 5/10
[52] U.S. Cl. ................. 180/148; 92/117 A; 180/158
[58] Field of Search ............. 180/148, 154, 158, 162; 92/117 R, 117 A

[56] References Cited

FOREIGN PATENT DOCUMENTS 883710 6/1953 Fed. Rep. of Germany ............ 180/154
939735 3/1956 Fed. Rep. of Germany ............ 180/148

Primary Examiner—John A. Pekar
Attorney, Agent, or Firm—Paul David Schoenle; Ken C. Decker

[57] ABSTRACT

A rack and pinion power steering device includes a housing which defines a cavity and the housing communicates with a pressure source. A pinion extends into the housing cavity to engage a rack which is movably supported by a sleeve member. The rack engages a valve member to control communication from the pressure source to a pair of chambers within the sleeve member. The pair of chambers are separated by a partition and a pair of rods are fixedly secured to the partition. Extending from the housing the pair of rods cooperate with dirigible wheels to control the direction of the dirigible wheels. The housing includes portions which slidably support the sleeve member and the pair of rods and partially define the pair of chambers. The sleeve member and pair of rods are movable relative to the housing in response to pressure within the pair of chambers.

8 Claims, 1 Drawing Figure

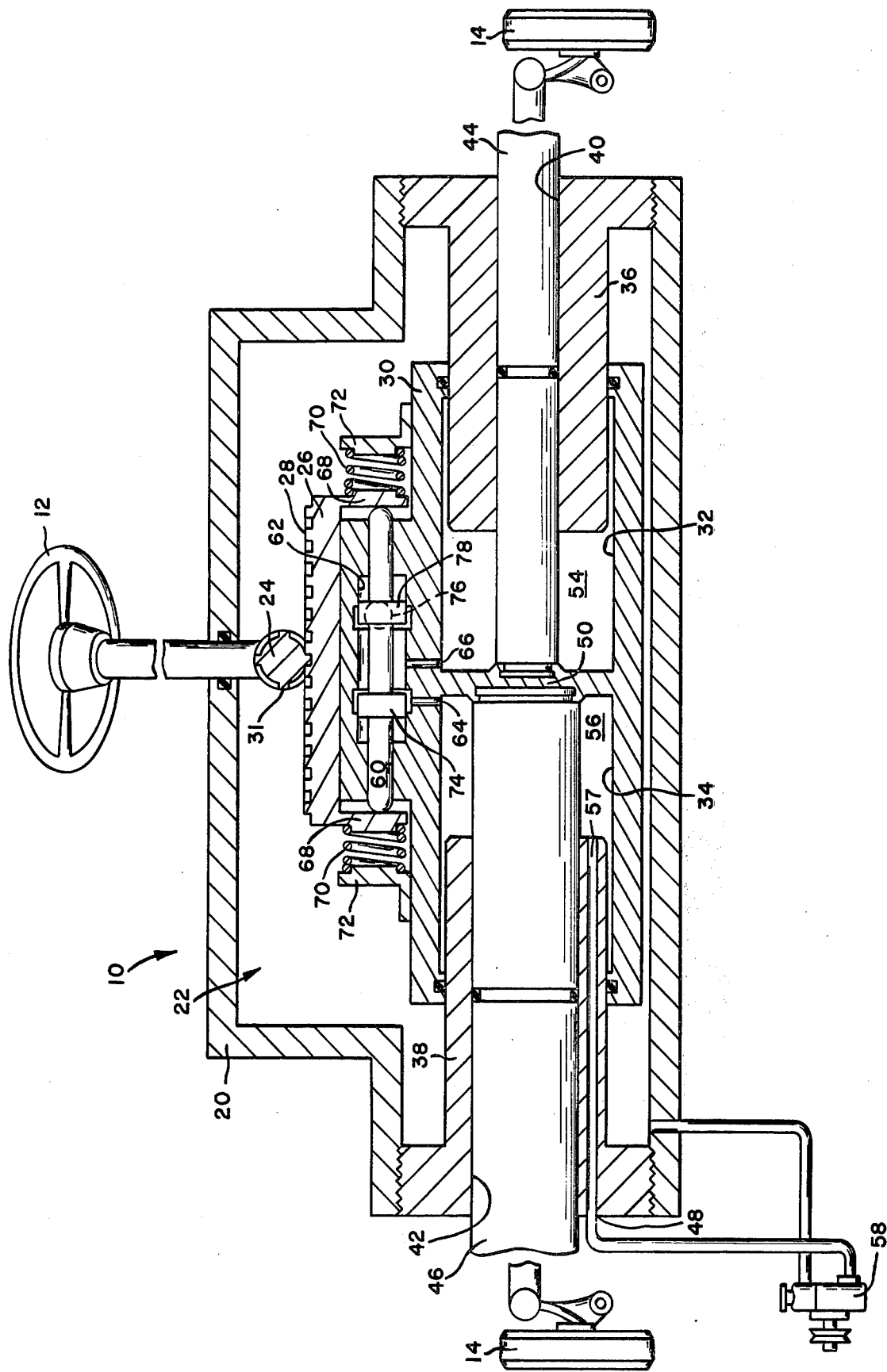

RACK AND PINION STEERING DEVICE

BACKGROUND OF THE INVENTION

In my copending U.S. applications Ser. No. 801,882 and 811,112 a rack and pinion steering device communicated fluid pressure to pressure chambers on opposite sides of a piston in order to move the piston and attached steering rod, thereby controlling the direction of a pair of dirigible wheels. In U.S. application Ser. No. 801,882, the piston is slidably mounted within the rack, while in U.S. application Ser. No. 811,112 the piston is slidably mounted within the housing. As the pistons in both U.S. applications Ser. Nos. 801,882 and 811,112 require close tolerances with their corresponding bores, it is believed to be an improvement in the art to provide a rack and pinion steering device which functions in the absence of such a piston.

SUMMARY OF THE INVENTION

The present invention relates to a rack and pinion power steering device wherein a housing defines a cavity and a pinion extends into the cavity to engage a rack therein. The housing includes portions extending into the housing cavity and slidably supporting a sleeve member which, in turn, slidably supports the rack. The sleeve member forms a pair of openings which open in opposite directions and are separated by a partition on the sleeve member, so that the sleeve member is substantially H-shaped.

In order to couple the steering device to a pair of dirigible wheels, a pair of rods are fixedly secured to the partition and coupled to the dirigible wheels so that movement of the sleeve member imparts a change in direction for the dirigible wheels. The housing portions cooperate with the pair of rods and the sleeve member to substantially define pressure chambers which communicate with a pressure source. A valve member carried by the sleeve member engages the rack and communicates with the pressure source such that movement of the rack by rotation of the pinion causes the valve member to move relative to the sleeve member, thereby communicating the pressure source with one of the pressure chambers. The increase of pressure in the one of the pressure chambers acts against the housing partition to move the sleeve member and pair of rods relative to the housing.

BRIEF DESCRIPTION OF THE DRAWING

The sole FIGURE is a schematic illustration partly in cross section, of a rack and pinion power steering device made in accordance with the present invention.

DETAILED DESCRIPTION

The rack and pinion power steering device 10 illustrated in the sole FIGURE includes a steering wheel 12 which is generally positioned within a vehicle operator's compartment for rotation by a vehicle operator and a pair of dirigible wheels 14 for steering the vehicle. The steering gear of the rack and pinion power steering device 10 is disposed within a housing 20 which defines a cavity 22.

A pinion 24 coupled to the steering wheel 12 extends into the housing cavity 22 and engages a rack 26. Teeth 28 on the rack 26 engage matching teeth 31 on the pinion 24 so that rotation of the pinion 24 imparts transverse movement to the rack 26.

In accordance with the invention a sleeve member 30 is provided with openings 32 and 34 which face opposite directions and housing portions at 36 and 38 extend into the respective openings 32 and 34 to slidably support the sleeve member within the housing cavity 22. The housing portions 36 and 38 form bores 40 and 42 therethrough for slidably and sealingly receiving respective rods 44 and 46 which connect with the right wheel and the left wheel, respectively.

The openings 32 and 34 are separated by a partition 50 on the sleeve member 30 and the rods 44 and 46 are fixedly secured to the partition by any suitable means. The partition cooperates with the sleeve member, the pair of rods 44 and 46 and the portions 36 and 38 to define a pair of pressure chambers 54 and 56.

In order to provide a power assist to the vehicle operator, a power steering pump or pressure source 58 communicates with an inlet port 48 on the housing portion 38 and a passage 57 in the portion 38 communicates the power steering pump 58 with the pressure chamber 56. The sleeve member 30 supports a valve member 60 in a stepped bore 62 and a passage 64 communicates the pressure chamber 56 with the bore 62, while a passage 66 communicates the stepped bore 62 with the pressure chamber 54. Flanges 68 on the rack 26 engage the valve member 60 to move the latter within the stepped bore 62 when the rack is moved by rotation of the pinion 24.

A pair of springs at 70 oppose arms 72 on the sleeve member 30 and the flanges 68 in order to position the valve member 60 in a neutral position within the stepped bore 62. In this neutral position sustantially one-half of the pressure from the pressure chamber 56 is communicated to the pressure chamber 54 in view of the restriction provided in the passage 64 by the land 74 and the opening of the return port 76 by the land 78. Consequently, the cross-sectional area of the rod 44 is substantially one-half of the cross-sectional area of the rod 46 at the partition 50 so that the sum of the forces acting against the partition 50 are equal in the neutral position.

MODE OF OPERATION

During normal vehicle operation, the power steering pump 58 communicates pressurized fluid to the pressure chamber 56 via inlet port 48 and passage 57. With the valve member 60 in the neutral position, the pressurized fluid within chamber 56 is communicated through passages 64 and 66 into pressure chamber 54, past restriction 74. A portion of the pressurized fluid within the stepped bore 62 is communicated to the return port 76 so that the restriction provided by land 74 and the return port 76 cooperate in the neutral position to communicate substantially one-half of the pressure in chamber 56 to the chamber 54. Consequently, the forces acting against the partition 50 by the pressurized fluid within chambers 54 and 56 are opposed by one another so that the sleeve member 30 remains fixed relative to the housing.

When the vehicle operator rotates the steering wheel 12 through an increment in order to change the direction of the vehicle, the pinion 24 is also rotated to impart transverse movement to the rack 26. The flanges 68 on the rack are also moved, thereby moving the valve member 60 within the stepped bore 62. If the valve member 60 is moved to the right, the land 74 increases the restriction across passage 64 to increase the pressure within chamber 56 while concurrently increasing the opening of the return port 76 by the land 78 to decrease the pressure within the chamber 54. Therfore, the forces acting against the partition 50 are greater on the chamber 56 side so that the sleeve member 30 and rods 44 and 46 are moved to the right until the valve member 60 is again disposed in a neutral position relative to the sleeve member 30. If the valve member 66 is moved to the left, the land 74 increases the opening across passage 64 to reduce the restriction across passage 64 and the land 78 reduces the opening across return port 76 to increase the restriction across return port 76, thereby substantially equating the pressures within chambers 54 and 56. With substantially equal pressures in the chambers, the increased area of the partition 50 exposed to chamber 54 results in the forces in chamber 54 overcoming those in chamber 56 to move the sleeve member 30 to the left until the sleeve member and valve member are disposed in the neutral position.

If the pressure source 58 fails to communicate pressurized fluid to the housing 20, the rack and pinion steering device will function manually as the rack flanges 68 are engageable with the portion of the sleeve member 30 which supports the valve member 60 in order to impart transverse movement to the sleeve member and attached rods.

Although the present invention is illustrated with different sizes for the rods 44 and 46, it is readily apparent that a pair of rods of substantially the same diameter and cross-sectional area could be provided. With the same size for the rods the valve member 60 would require slight modification to communicate equal pressures of pressurized fluid to chambers 54 and 56 in the neutral position.

Moreover, many modifications and/or alterations to the present invention are possible by one skilled in the art and it is intended that these modifications and/or alterations fall within the scope of the appended claims.

I claim:
1. A steering device comprising:
a housing defining a cavity and having an inlet port communicating with a fluid pressure source;
a sleeve member movably disposed within said housing cavity and including passage means communicating with the inlet port;
a valve member carried by said sleeve member for controling fluid flow in said passage means;
a pair of rods fixedly secured to said sleeve member and extending outwardly of said housing; and
a rack engageable with said valve member and movable relative to said sleeve member to impart movement to said valve member;
said housing cooperating with said pair of rods and said sleeve member to define a pair of chambers, said rack being movable to impart movement to said valve member relative to said sleeve member so as to increase fluid pressure communicated to one of the pair of chambers via the passage means, said sleeve member and said pair of rods being movable relative to said housing in response to the increased fluid pressure communicated to one of the pair of chambers, and said sleeve member defining at least one opening for receiving a portion of said housing to slidably support said sleeve member within said housing.

2. The steering device of claim 1 in which said sleeve member includes a partition separating said pair of chambers and said pair of rods are fixedly secured to said partition.

3. The steering device of claim 1 in which said housing portion comprises a pair of plugs extending into said housing cavity, said sleeve member defining a pair of openings and said pair of plugs extending into said pair of openings to slidably support said sleeve member.

4. The steering device of claim 3 in which one of said pair of plugs includes a passage communicating with the inlet port and one of said pair of chambers.

5. A steering device comprising:
a housing defining a cavity and having an inlet port communicating with a pressure source;
a sleeve member disposed within said housing cavity, said sleeve member defining a pair of openings which are opposite each other, said openings having a common bottom wall forming a partition separating the pair of openings;
a valve member cooperating with said sleeve member to communicate the inlet port with said pair of openings via passage means in said sleeve member; and
a pair of rods fixedly secured to said sleeve member and extending outwardly from the pair of openings;
said housing including portions extending into said pair of openings and cooperating with said sleeve member and said pair of rods to define chambers which communicate with the inlet port, said valve member cooperating with passage means in said sleeve member to control communication between the inlet port and the chambers so that pressure communicated to said chambers causes said sleeve member and said pair of rods to move relative to said housing.

6. The steering device of claim 5 in which said pair of rods are fixedly secured to said partition.

7. The steering device of claim 5 in which said housing portions slidably support said sleeve member and said pair of rods.

8. The steering device of claim 5 in which said sleeve member is substantially H-shaped in longitudinal section.

* * * * *